INVENTORS
PHILIPPE WALLET
HENRI TAVERNE
BY
*Bacon & Thomas*
ATTORNEYS

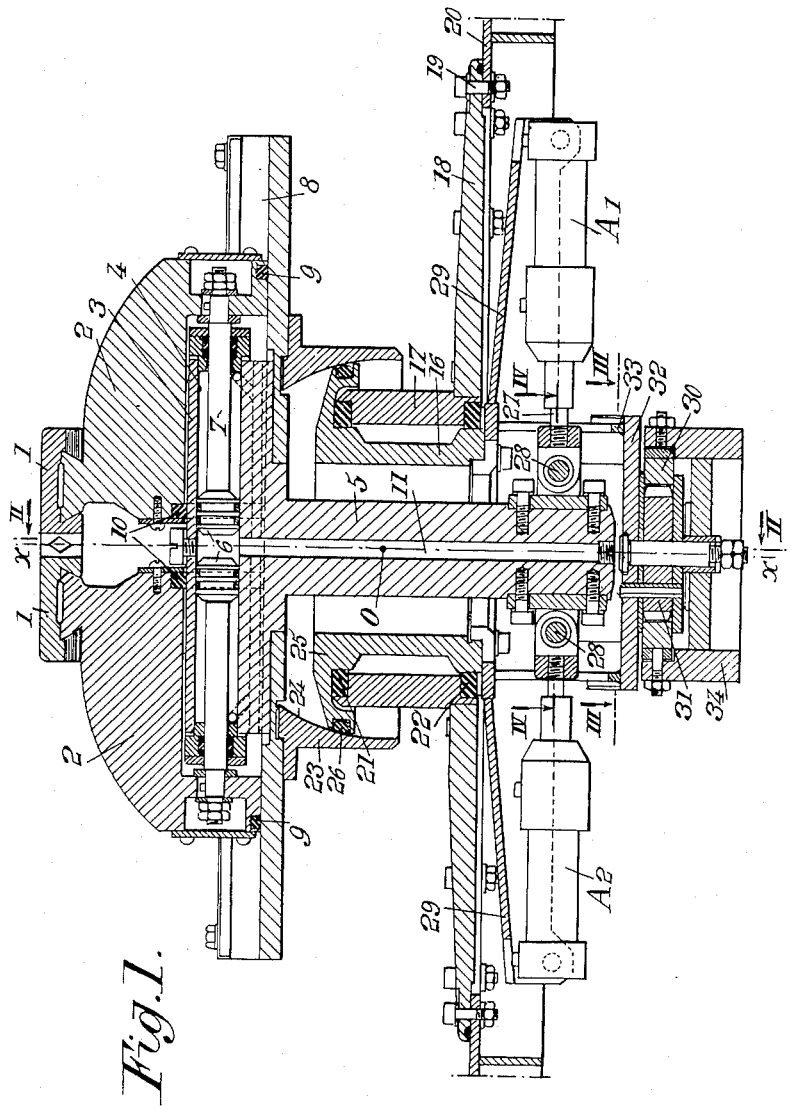

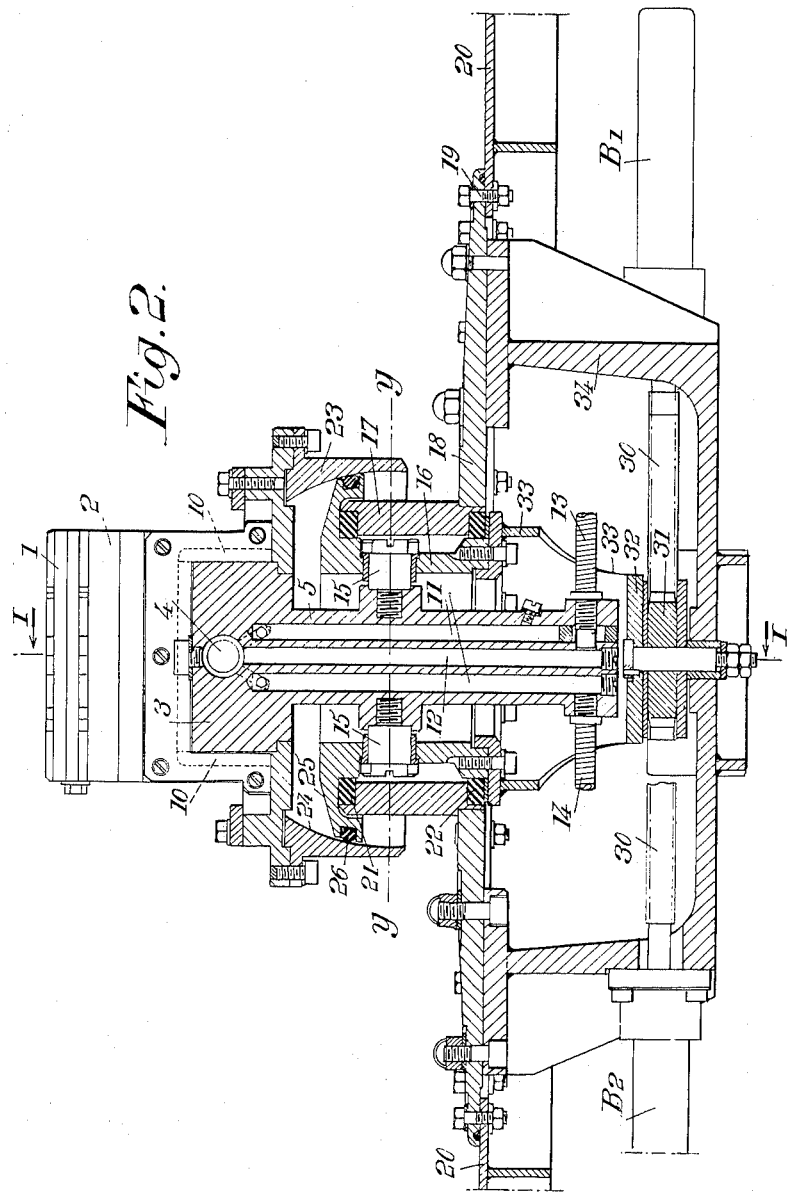

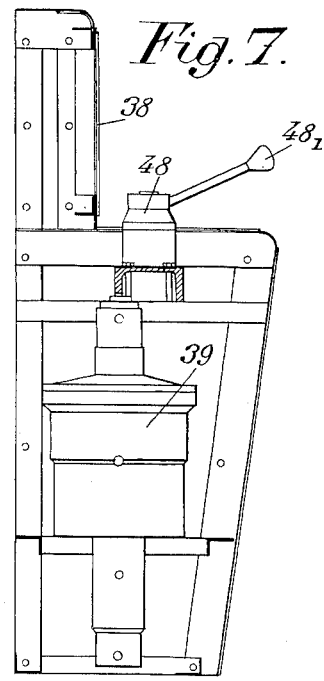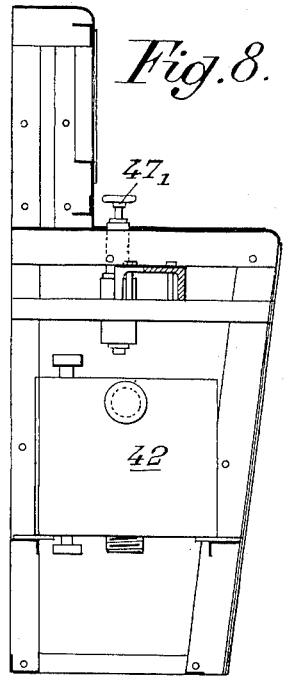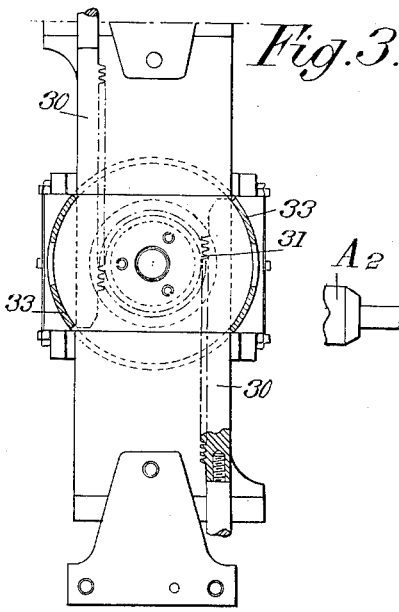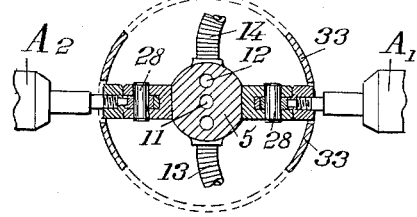

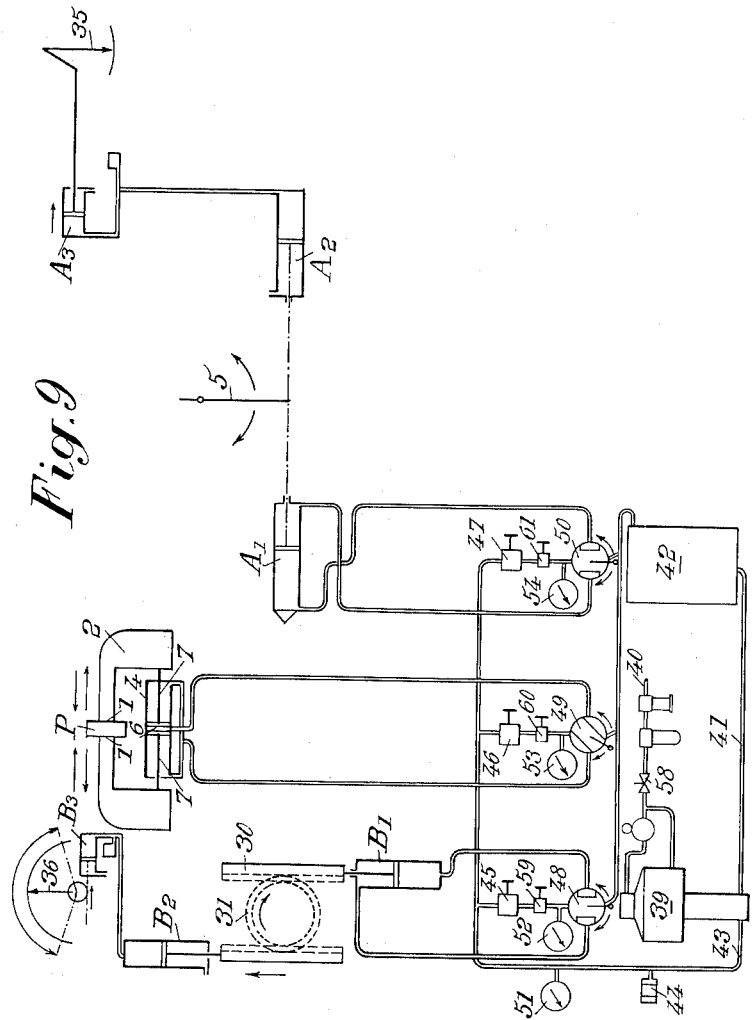

United States Patent Office 3,198,347
Patented Aug. 3, 1965

3,198,347
REMOTE CONTROL APPARATUS
Philippe Wallet, Vincennes, and Henri Taverne, Saclay, France, assignors to Commissariat a l'Energie Atomique, Paris, France
Filed Dec. 28, 1961, Ser. No. 162,812
Claims priority, application France, Jan. 12, 1961, 849,474
8 Claims. (Cl. 214—1)

The present invention relates to remote control apparatus for maneuvering members within inaccessible sealed enclosures, for example, for maneuvering tongs for manipulating radioactive objects or receptacles containing such objects, and particularly for presenting them to various measuring or machining instruments within the enclosure.

It is a particular object to make the apparatus better suited to various practical requirements than heretofore, particularly as regards the accessibility of their working parts and the help they give the operator for carrying out his work.

According to the invention, there is provided remote control apparatus for maneuvering members within an inaccessible sealed enclosure, particularly for maneuvering tongs for manipulating radioactive objects or receptacles containing such objects, and having the tongs or the like mounted on arms or manipulating supports passing in hermetically sealed relation through the wall of the enclosure, the control means therefor being situated outside the said enclosure, said apparatus comprising a tubular member which passes in hermetically sealed relation through the wall of the enclosure, a support swingably mounted on a tubular member and carrying gripping members, hermetic sealing means arranged between the said swingable support and the inside of the tubular member, motor means to control, on the one hand, the swinging movement of the support in relation to the tubular member and, on the other hand, the rotation of the tubular member around its axis, and control means for displacing the gripping means.

Other arrangements are also preferably used at the same time and will be referred to in greater detail below.

For example, in apparatus of the type referred to above repeater means may be provided, to allow the positions of the active members which are located on the inside of the enclosure, to be noted at any time from dials or the like (or in any other manner); and, for example, in the case where the control of the said members and their manipulating members is carried out by means of jacks, repeating jacks may be combined with said jacks to activate indexing or other members representing the various movements of said members.

Figure 5:
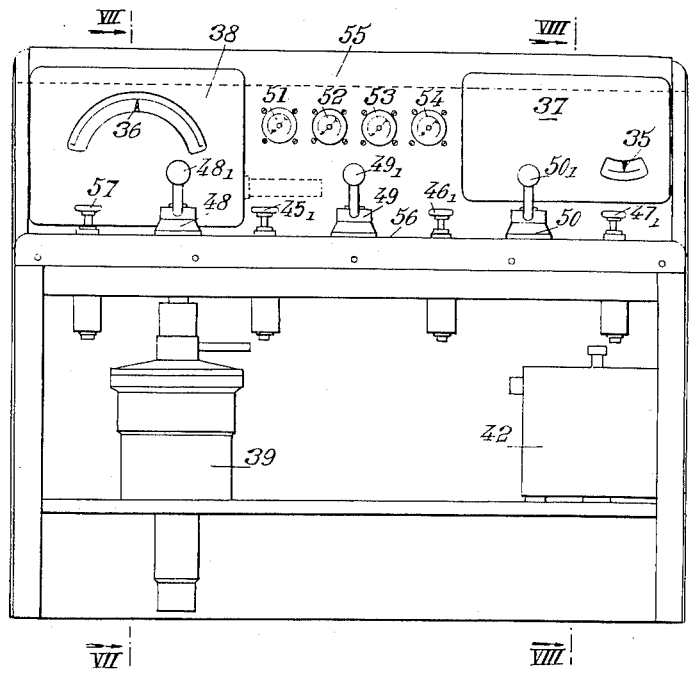
Figure 6:
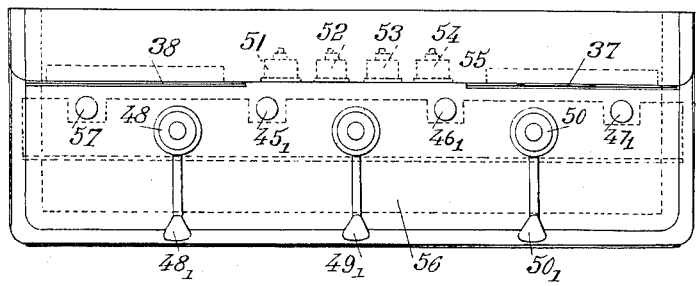

In order that the invention may be more clearly understood, reference will now be made to the accompanying drawings which show one embodiment thereof by way of example, and in which:

FIGURE 1 shows a section through the assembly, perpendicular to the enclosure wall, along the line I—I of FIGURE 2, FIGURE 2 shows a section through the assembly, along the line II—II of FIGURE 1, FIGURE 3 shows a cross-section of the assembly along the line III—III of FIGURE 1, FIGURE 4 shows a cross-section of the assembly along the line IV—IV of FIGURE 1, FIGURE 5 shows an elevation of a control desk for the apparatus, FIGURE 6 shows a plan view of the desk of FIGURE 5, FIGURE 7 shows a section along the line VII—VII of FIGURE 5, FIGURE 8 shows a section along line VIII—VIII of FIGURE 5, and FIGURE 9 is a diagram illustrating the operation of the apparatus.

Referring to the drawings, the hermetically sealed enclosure illustrated is intended for the treatment and examination of radioactive members by a remote control manipulating device for displacing said members within the enclosure.

This apparatus is arranged in such a way that its active or manipulating members, that is to say the kinematic means intended to support members P and to effect their displacement, pass hermetically through the said wall and are moved by members such as hydraulic jacks (it being understood that other control means can be used, for example, mechanical or electrical) arranged outside the enclosure and themselves operated by remote control.

Easy accessibility to the jacks or other members is thus ensured without it being necessary to penetrate into the enclosure, it being understood that all precautions should be taken to assure hermetic sealing at the points where the said manipulating members displace one another or are displaced in relation to the wall of the cell.

Although it is possible to proceed in various ways, in order to achieve the conditions specified above, it is advantageous to adopt an arrangement according to which:

The gripping parts of members P to be manipulated— for example the jaws of a tongs arrangement, as assumed hereinafter—are supported by a first support which is mounted in such a way that it can be swung around the axis of a tubular member which is passed in hermetically sealed relation through the wall of the cell or enclosure and at the same time can be rotated around its own axis.

Sealing means are provided between the swingable support and the interior of the tubular member in order to ensure total separation from the contaminated atmosphere of the cell or enclosure, the sealing being also effective along the sliding surfaces of the jaws, and the desired displacements are communicated to the jaws, to the swingable support and to the tubular member by means of jacks which are outside the enclosure and are, in any case, separated from the contaminated atmosphere thereof.

FIGURES 1 to 4 illustrate one of the embodiments which can be adapted in order to put the preceding arrangement into effect.

According to this embodiment, the two jaws 1 are supported, preferably in such a way that they are interchangeable on their respective supports 2, which are mounted in such a way that they can be slid along the side swingable support which is constituted, for example, by a head 3, comprising the cylinder 4 of a double jack adapted to activate the two elements of the manipulating tongs, a central pillar 5, bored for the passage of the jack fluid, being connected to the head 3.

Two pistons are shown at 6 which are mounted on rods 7 connected to the two support elements 2 which slide in suitable channels or grooves 8, with the interposition of the sealing gaskets 9, 10, along the slide surfaces in order to prevent the passage of contaminated dusts. The supply and outlet passages of the fluid are shown at 11 and 12, these passages being connected at the extremity of pillar 5 to supply conduits 13, 14 leading to the remote control post.

The support assembly as referred to is mounted in such a way that it can be swung around swivel pins 15 (FIGURE 2) inside the tubular member which is shown at 16 and which, in turn can turn around its axis x—x, as it is located inside a sleeve 17 integral with the wall of the enclosure or cell or a detachable assembly device 18, integral at 19 with the wall 20.

Hermetic sealing between the rotary tubular member 16 and the fixed sleeve is effected by means of gaskets 21, 22.

So far as hermetic sealing between the pivoting support 5 and the tubular member 16 is concerned, this is ensured for example by providing a cover 23 fixed to or integral with support 3, 5, the cover having a spherical surface 24 on the inside, the center of which is on the axis common to the swivel pins 15, referred to above, and by causing this cover to rest against the circular edge of a plate or edge 25 integral with member 16, with the interposition of a sealing gasket 26.

It will be apparent that such an assembly enables the manipulating tongs to be rotated around both the axis $x$—$x$ of the member 16 (FIGURE 1), and the axis $y$—$y$ of the swivel pins 15, at least for a certain amount which, in the illustrated embodiment, is limited for example to 15° either side of the axis, but which could be greatly increased by various modifications in the structure.

Due to the foregoing, an hermetic sealing is ensured so that the control jacks can be displaced in the two ways mentioned above, behind the wall 20 or the wall 18 where they are easily accessible.

A jack has been illustrated at $A_1$, in FIGURES 1 to 4, the rod 27 of which engages at 28 with the pillar 5 of the swingable support. At $A_2$, a repeating jack is shown which will be referred to in greater detail further on. The two jacks are articulated to fixed or detachable supports 29 which turn with the rotary member 16.

FIGURE 2 shows a jack $B_1$, having a rod which engages a toothed rack 30 engaging with cogs 31 which are part of a connection means 32, 33 fixed to the member 16. Another repeating jack $B_2$ is provided, opposite jack $B_1$, the two jacks being supported by a fixed structure 34 which also supports the shaft of pinion 31.

The remote control arrangements will now be described, that is to say, the means which allow members such as the jacks described above (or all receiving members whatever their nature) to be operated from a distant point.

Preferably, according to another feature of the invention, this remote control includes repeating means which allow the operator to follow the displacements of the manipulating tongs on dials or by any other indicator means (so that it becomes unnecessary to exercise visual control through the walls of the cell).

These means are, for example, constructed as shown by the drawings, by means of repeater jacks $A_2$, $B_2$ already indicated above, these jacks co-operating with corresponding receiver jacks $A_3$, $B_3$ which control the indexing members or like elements 35, 36 moving in front of dials 37, 38 (FIGURE 9).

Each time that a movement is communicated to the two elements of the tongs in question, that is to say to the tubular member 16 and the swingable support 3, 5, corresponding displacements of indexing members 35, 36 result so that by observing these indexing members, the operator knows exactly, at any moment, in what position the tongs are to be found.

Dials 37, 38, as well as the various maneuvering members for obtaining the action of the fluid in the jacks are preferably grouped on a stand or control desk such, for example, as that illustrated in FIGURES 5 to 8, according to the operation diagram in FIGURE 9.

The control fluid is preferably obtained from a hydropneumatic pump 39, suitably driven and receiving suitably filtered air at 40 and liquid at 41, fed from a reservoir 42; these various members may be located for example, in the lower portion of the desk (FIGURES 5 to 8).

The liquid under pressure, leaving at 43, is first of all passed through a storage device 44, then is distributed to adjustable pressure reducers 45, 46 47, in such a way that a suitable control pressure is available at the entrance to the distributors 48, 49, 50.

Various manometers are provided at 51, 52, 53, 54 and are visible on panel 55, which is part of the desk. The two screens 37, 38 are also mounted on this panel.

On panel 56 of the desk are levers $48_1$, $49_1$, $50_1$ for the above-mentioned distributors, as well as buttons $45_1$, $46_1$, $47_1$ for controlling the above-mentioned pressure reducers. Another button 57 controls for example, a shut-off valve 58 of the air intake for pump 39.

Additional valves 59, 60, 61 can also be provided in order to regulate the liquid flow, that is to say the speed of movement of the jacks.

Hereinabove, a manipulating assembly has been described which comprises only two movements, that is to say rotation of the tubular member 16 around the axis $x$—$x$ and the pivoting of support 3, 5 around the axis $y$—$y$, but all assemblies including more or less complex members can also be provided, possibly comprising more than two elementary movements, while continuing to apply the other arrangements according to the invention.

Consequently, whatever the embodiment adopted, a manipulating assembly can be established, in particular manipulating tongs or other gripping devices, the operation of which is sufficiently revealed hereinabove, so that further explanation is unnecessary and which has in relation to the already existing apparatus of the kind in question, numerous advantages, in particular:

The possibility of maintaining outside the hermetic enclosure all the active control members, which can thus be reached if in need of repair, Elimination of any risk of contamination as a result of the hermetic sealing means provided, And possibility for the operator to control at any time the position of the manipulating members within the enclosure.

It will be apparent that the invention has been described only by way of example and that various modifications may be made to the specific details referred to, without in any way departing from the scope thereof.

What we claim is:

1. Apparatus for remotely controlling manipulating devices to maneuver radioactive objects and the like within a sealed enclosure by means of controls outside said enclosure, said apparatus comprising a tubular member passing through a wall of said enclosure and rotatably mounted with respect to said wall for rotation about its own axis, a first sliding sealing means provided between said wall and said tubular member to effect a hermetic seal therebetween, a support disposed within said enclosure and pivotally mounted on said tubular member, gripping members carried by said support, a second sliding sealing means positioned between said support and said tubular member to effect a hermetic seal therebetween, a first motor means operatively connected with said support to control pivotal movement of said support with respect to said tubular member, a second motor means operatively connected with said tubular member to control rotation thereof, and controls operatively connected with said gripping means for actuating said gripping means.

2. Apparatus as claimed in claim 1 wherein said support comprises a head member having two jacks mounted therein and arranged to act in opposite directions, each of said last-mentioned jacks being operatively connected with one of said gripping members to control the gripping movement thereof, said head member being mounted on a central pillar pivotally secured within said tubular member by means of opposed pins projecting inwardly from the inner wall of siad tubular member.

3. Apparatus as claimed in claim 2 wherein said head member comprises a cover member having a convex inner surface adapted to cooperate with the peripheral edge of a circular member fixed on said tubular member and projecting outwardly therefrom, and hermetic sealing means provided on said peripheral edge to form a hermetically sealed sliding joint between said peripheral edge and said convex inner surface for relative movement therebetween.

4. Apparatus as claimed in claim 3 wherein said inner surface constitutes a spherical portion having its center point disposed at the middle of the pivotal axis extending between said pins.

5. Apparatus as claimed in claim 2 wherein pivotal movement of said support on said pins is controlled by a jack operatively connected to the base of said central pillar and mounted for rotation with said tubular member.

6. Apparatus as claimed in claim 5 including a jack operatively connected with said tubular member by means of a rack-and-pinion connection for controlling rotation of said tubular member.

7. Apparatus as claimed in claim 6 comprising control means disposed at external station and operatively connected with the respective jacks to actuate the same, and means at said station for indicating movement of said apparatus through actuation of said jacks.

8. Apparatus as claimed in claim 2 including repeater jacks operatively connected with respect to the remaining jack members to actuate dials positioned at an external station.

References Cited by the Examiner
UNITED STATES PATENTS

| | | |
|---|---|---|
| 2,822,094 | 2/58 | Greer. |
| 2,861,701 | 11/58 | Bergsland. |
| 2,868,155 | 1/59 | Phillips _____ 116—124 |

FOREIGN PATENTS 1,246,940   10/60   France.

HUGO O. SCHULZ, *Primary Examiner.*

ERNEST A. FALLER, *Examiner.*